United States Patent [19]

Cornelissen

[11] Patent Number: 4,895,652
[45] Date of Patent: Jan. 23, 1990

[54] CROSS-FLOW SEPARATOR

[75] Inventor: Jan Cornelissen, Hague, Netherlands

[73] Assignee: Pielkenrood-Vinitex B.V., Netherlands

[21] Appl. No.: 768,031

[22] Filed: Aug. 21, 1985

Related U.S. Application Data

[63] Continuation-in-part of Ser. No. 551,374, Nov. 10, 1983, abandoned.

[30] Foreign Application Priority Data

Nov. 12, 1982 [NL] Netherlands .......................... 8204412

[51] Int. Cl.$^4$ ............................................. B01D 21/00
[52] U.S. Cl. ..................................... 210/320; 210/521
[58] Field of Search ................. 210/320, 521, DIG. 5, 210/522, 802

[56]  References Cited

U.S. PATENT DOCUMENTS

| | | | |
|---|---|---|---|
| 2,207,399 | 7/1940 | Gaertner | 210/521 |
| 3,399,135 | 8/1968 | Conley, Jr. et al. | 210/521 |
| 3,666,112 | 5/1972 | Pielkenrood et al. | 210/521 |
| 3,837,501 | 9/1974 | Pielkenrood | 210/522 |
| 4,096,063 | 6/1978 | Hashimoto et al. | 210/521 |
| 4,116,789 | 9/1978 | King | 210/521 |
| 4,133,771 | 1/1979 | Pielkenrood | 210/521 |

FOREIGN PATENT DOCUMENTS

| | | | |
|---|---|---|---|
| 663892 | 7/1938 | Fed. Rep. of Germany | 210/521 |
| 994118 | 11/1951 | France | 210/521 |

Primary Examiner—Frank Spear
Attorney, Agent, or Firm—Beehler, Pavitt, Siegmund, Jagger, Martella & Dawes

[57] ABSTRACT

A gravity cross-flow separator of the type comprising mutually parallel spaced-apart plates defining a substantially horizontal liquid flow path between each pair of adjacent plates for passing a liquid to be treated by gravity separation, the plates being inclined relative to a horizontal plane and defining upper and lower gutters extending substantially in the direction of liquid flow for collecting components separated from the treated liquid and disposed above and below the flow path, respectively, is improved in that the upper gutters of each flow path are in facing alignment with the lower gutters of the same flow path.

4 Claims, 2 Drawing Sheets

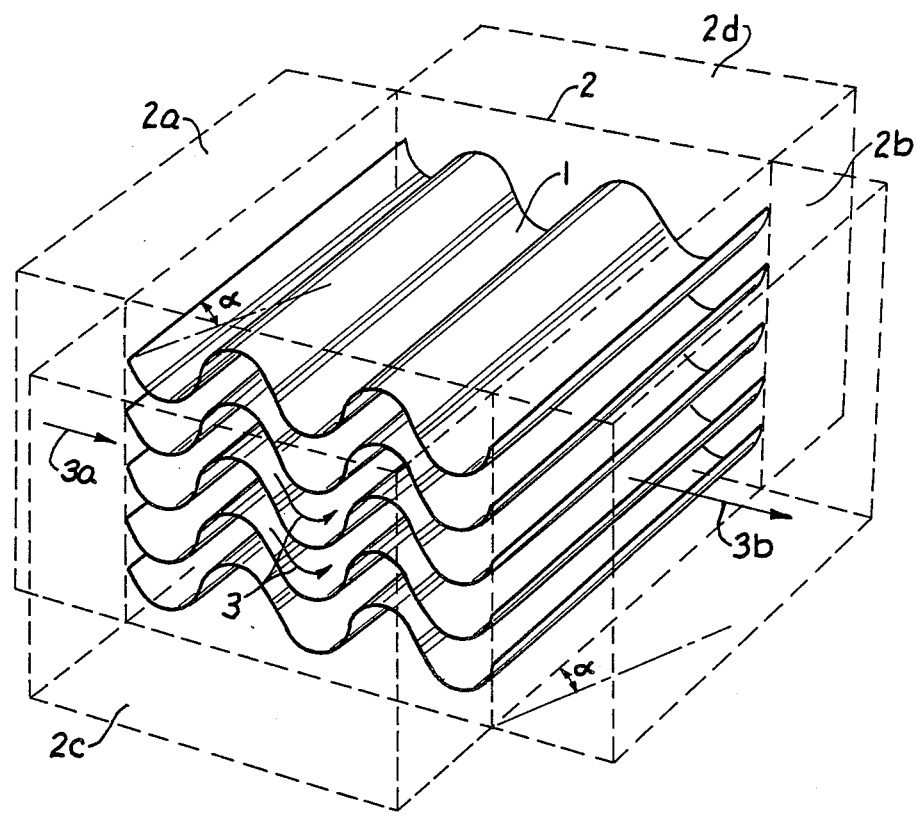
FIG. IA
PRIOR ART

CROSS-FLOW SEPARATOR

This is a continuation-in-part of Application Ser. No. 551,374, filed Nov. 10, 1983, now abandoned.

BACKGROUND OF THE INVENTION

1. Field of the Invention

Cross-flow separators are often used for separating from a liquid particles (also comprising liquid and gas bubbles) suspended therein.

2. State of the Prior Art

A cross-flow separator comprises an assembly of plates arranged at mutually equal distances at an inclination angle, between which plates passages for passing a liquid to be treated are defined, the flow direction of said liquid being directed transversely to the direction of largest inclination of said plates, said plates being provided with profiles defining collecting gutters for the components separated from said liquid by gravity, i.e., because of the fact that said particles are heavier or lighter than the carrier liquid in which they are suspended. Said plates extend substantially in said direction of largest inclination. These collecting gutters open into collecting spaces for said separated components. Cross-flow separators of this kind are shown in U.S. Pat. Nos. 3,837,501 and 4,133,771, both to Jacob Pielkenrood, and assigned to the same assignee as the present patent application.

The currently used cross-flow separators mainly comprise corrugated plates, the corrugation wave height being larger than the average plate distance. The corrugation crests and valleys of adjacent plates respectively are, then, superimposed i.e. in phase. A consequence of the oscillating movement which the liquid is forced to follow is that the flow velocity at which the liquid changes from the laminar into the turbulent condition is lower than in the case of a rectilinear flow in a plate assembly with the same average plate distance. Moreover, the degree of turbulence will, then, increase faster than in the case of a rectilinear flow.

A further drawback of such assemblies of phased corrugated plates is that the streamlined shape of the corrugation crests and valleys will promote entrainment of the already separated particles by the liquid, and the capacity of the collecting gutters defined by the corrugations will be small.

The drawback of the cross-flow separators with flat or plane plates, which have been known for a longer time, in which the liquid flow is substantially rectilinear, is, however, that the separated particles which can slide downwards along the inclined plates will contact the liquid over the whole plate surface, so that the probability of being entrained again by the liquid will be higher accordingly. It has appeared that the separation effect of corrugated plates is better than that of plane plates, but nevertheless, this effect might be still improved.

SUMMARY OF THE INVENTION

It is an object of the invention to improve the efficiency of a cross-flow separator of the above-mentioned kind, and to that end the profiles of the plates are shaped in such a manner that the collecting gutters defined thereby at both sides of a liquid passage face each other, i.e. the wave crests and valleys of the corrugations of adjacent plates are out of phase with each other.

Thereby it is obtained that the liquid flow is no longer compelled to follow an oscillating line determined by the plate profiles, so that turbulences and washing-out effects caused thereby will be avoided.

In one particular embodiment, the gutter profiles are formed by upstanding ridges which are substantially mutually aligned.

It is also possible to use corrugated plates, the corrugations of adjacent plates being arranged in phase opposition, said corrugations preferably having a substantially trapezoidal cross section.

For liquids having a low viscosity which do not tend to follow the contour of the gutters, the gutter volume which can be considered as a lost space will be kept as small as possible. More viscous liquids do follow the gutter contour, so that, then, deeper gutters are favorable so as to screen the separated material and, at the same time, the velocity of the liquid is reduced there.

BRIEF DESCRIPTION OF THE DRAWINGS

The invention will be elucidated below by reference to a drawing, showing in.

DETAILED DESCRIPTION OF THE PREFERRED EMBODIMENTS

Figure 1:
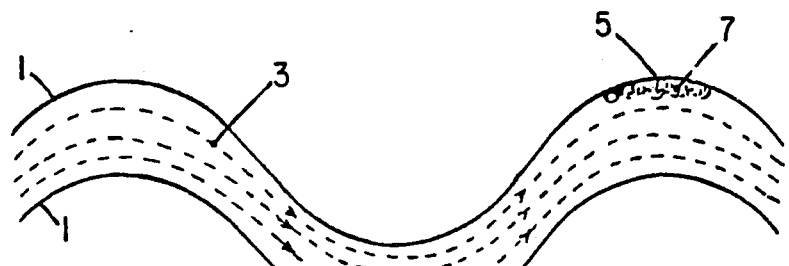
FIG. 1A a highly simplified representation in perspective of a cross-flow separator of the prior art.
FIG. 1B a partial cross section of two plates of the separator of FIG. 1A.

FIG. 1A shows in a highly simplified manner a so-called cross-flow separator according to the prior art, comprising a plurality of corrugated plates 1 which are superimposed within a suitable casing 2 of which only some border lines are shown. The plates 1 are inclined along the direction of the corrugations with respect to a horizontal plane, as indicated by angles $\alpha$. For a complete description of such a separator, reference is made to the above-mentioned prior U.S. patents issued to this assignee.

Arrows 3a and 3b indicate a liquid supply flow and a liquid discharge flow respectively, said flows being directed substantially perpendicular to the direction of the plate corrugations and substantially horizontally. Suitable supply and discharge chambers 2a and 2b respectively are provided at the respective sides of the plate assembly for producing said flows. The liquid flows between the plates 1, as is indicated by arrows 3.

FIG. 1B shows a partial cross section of two plates 1 of the separator of FIG. 1A. The sinusoidal corrugations of said plates consist of alternating valleys 4 and crests 5 respectively, which, in adjacent plates, are always facing each other, so that all corrugations are substantially in phase.

Heavier particles sedimentating from the liquid flow 3 collect in the corrugation valleys 4 as indicated at 6, and will slide downwards because of the inclination of said plates, and will be collected in a collecting chamber 2c suggested in dotted lining in FIG. 1A at the lower end of the plates 1, and as is shown in the above-referenced prior U.S. patents. The thickness of the layer of collected particles 6 is dependent on the velocity at which the particles slide downwards along the inclined plates, and on the supply of separated particles from the liquid. The same holds in the opposite sense for floating lighter particles collecting, as indicated at 7, in the corrugation crests 5, which particles will slide upwards towards a collecting chamber 2d, arranged at the upper end of the plates 1 and similarly suggested in dotted lining in FIG. 1A. If only particles of one kind are suspended in the liquid to be treated, only one collecting chamber will be necessary.

For liquids having a low viscosity, such as water, it has been found that the transfer velocity at which the flow changes from the laminar into the turbulent condition is considerably lower than in a rectilinear flow, which is caused by the oscillating movement of the flow 3. Behind the corrugation valleys and crests turbulences will be formed already at a low velocity, and, at a further increasing flow velocity, the flow will completely consist of turbulences. As the viscosity increases, also the velocity at which the flow becomes turbulent will increase. The consequence of such turbulences is that the particles collected in the valleys 4 and/or crests 5 will be whirled up and are entrained again, which unfavorably affects the separation effect of the separator.

As well as for liquids with a low as for those with a high viscosity, the streamlined shape of the gutters, i.e., the sinusoidal in-phase corrugation valleys 4 and crests 5, is unfavorable as to the entraining of separated particles 6 and 7. For the thickness of the layer of particles reduces the flow cross-section area, so that the flow velocity near the separated particles is increased, and, therefore, also the probability of turbulences and entraining are increased. A further drawback of this phased sinusoidal corrugation shape is that the capacity of the gutters defined by the corrugation crests and valleys is relatively small, and that the surface area of the particle assembly contacting the liquid is relatively large, which also increases the probability of their being entrained, in particular by small turbulences which may be generated by friction phenomena at the boundary surface with the flowing liquid.

A rectilinear passage in which a part of these drawbacks will not be present can be obtained, as such, in the simplest manner by means of plane plates which have been known for a long time. Since, however, the particles sliding downwards along the inclined plates are contacting the flowing liquid over the full plate surface, the probability of already sparated particles being entrained is very high. This is the very reason that corrugated plates have been introduced, by means of which the separated components can be kept out of the influence of the flowing liquid as well as possible.

Figure 3:
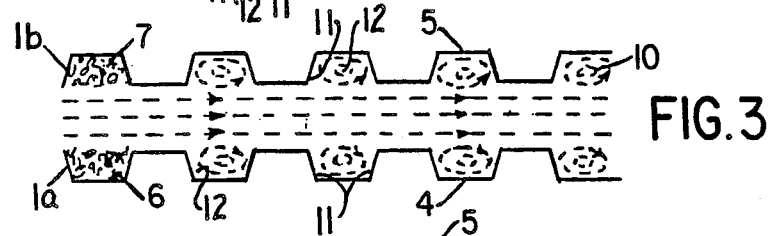
FIG. 3 a cross section corresponding to FIG. 2 of slightly modified plates.
Figure 4:
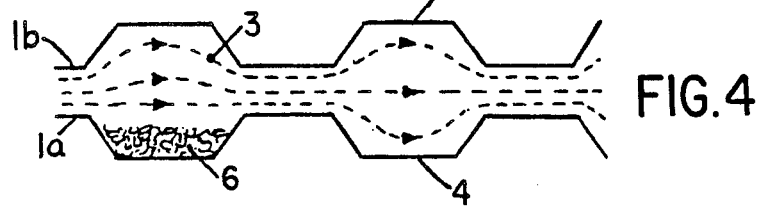
FIG. 4 a corresponding cross section of a modification of the plates of FIG. 3 for a liquid with a high viscosity.

The present invention provides an improvement over the known corrugated plate separators which allows the liquid flow to move substantially rectilinearly. In the embodiments of the plates for an improved separator according to the invention shown in FIGS. 2 through 4, the same reference numerals are used for parts corresponding to parts in FIGS. 1A and 1B. It is to be understood that FIGS. 2 through 4 show corrugated or otherwise formed gutters in cross section only but that the plates shown therein are also inclined at an angle α relative to a horizontal plane and the corrugations are transverse to the direction of liquid flow in a separator arrangement as shown in FIG. 1A.

Figure 2:
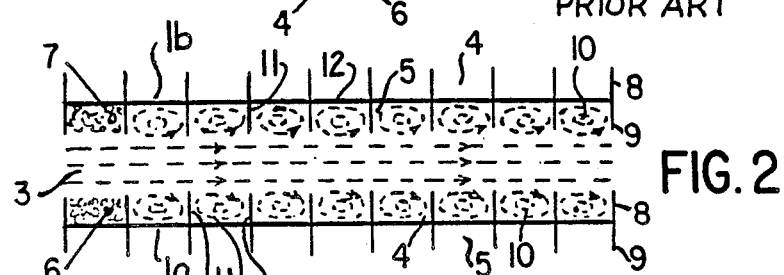
FIG. 2 a corresponding cross section of a first embodiment of plates according to the present invention.

FIG. 2 shows an embodiment of plates for liquids having a low viscosity, in which a substantially rectilinear flow is obtained, and the separated material remains outside the flow region. In FIG. 2 plane horizontal separator plates 1a and 1b are used which are provided on both sides with short vertical plates defining ridges 8 and 9 respectively, which ridges are mutually aligned, and also the ridges of adjacent ridges are mutually aligned, and also the ridges of adjacent plates are alighed. Thus, collecting gutters 4 and 5 are defined between adjacent ridges which correspond to the crests 4 and valleys 5 respectively, of a corrugated plate of FIG. 1, but which gutters now, in contrast to the case of FIGS. 1A and 1B, are facing each other in pairs at either side of the liquid flow 3, and the height of these ridges is such that a sufficiently wide passage for the liquid flow remains free between the ridges.

As shown in FIG. 2, the liquid flow 3 will extend mainly straight between the extremities of the ridges. At the beginning of the operation, when the gutters have not yet been filled by separated particles, turbulences will develop in these gutters as shown at 10, which turbulences, however, can enhance the separation. As the gutters become filled, these turbulences decrease. The separated particles can also be removed suspended in the liquid, in particular in the case of light flocs.

An advantage of the gutters with a square cross section thus obtained is, further, that, at corresponding dimensions, their capacity is larger than in the case of the sinusoidally corrugated plates of FIGS. 1A and 1B. Since, furthermore, the liquid flow is mainly rectilinear, the flow components directed towards the surface of the layers 6 and 7, which are present in the oscillating flow according to FIG. 1B and have a washing-out effect, will be absent.

FIG. 3 shows an embodiment which, fundamentally, is similar to FIG. 2, but in which, however, corrugated plates 1a and 1b are used having corrugations with a trapezoidal cross section, as in the case of so-called pile planks. Adjacent plates are arranged in phase opposition i.e. out of phase, so that the gutters 4 and 5 at either side of a liquid passage 3 are always facing each other. In the case of both the ridges 8, 9 in FIG. 2 and trapezoidal corrugations of FIG. 3, the gutters have side walls 11 which are relatively steep in relation to the gutter bottoms 12 and are also generally transverse, as in FIG. 3, or actually perpendicular, as in FIG. 2, to the direction of the liquid flow 3. In the case of low viscosity fluids, these steep gutter sidewalls induce the aforementioned turbulences 10, while the gutters are largely empty and which can enhance separation. The turbulences 10 diminish as the gutters fill, decreasing the chances of entrainment of separated particles.

FIG. 4 shows an embodiment corresponding to FIG. 3, but having a larger wavelength and height of the plate corrugations, which embodiment is designed for a liquid with a higher viscosity, e.g., oil. At the flow velocities suitable for separation, no turbulences will be generated in the gutters, and the flow will substantially follow the contour of the plate profiles, this in contrast to liquids with a lower viscosity. It is favorable then to use a larger wavelength and height than in the case of FIG. 3.

As a gutter 4 is being filled with separated particles 6 (e.g., water droplets), the superimposed flows become more rectilinear. Since facing each of the lower gutters 4 is always an upper gutter 5 which is filled by the liquid flow, the flow velocity in the central part of the passage over each gutter 4 will become lower, so that the probability of particles 6 being entrained will become smaller accordingly.

A further advantage is that in the constrictions of the flow passage beyond the widened parts at the facing gutters 4 and 5 a certain flow acceleration will take place again which, as soon as the next widened part has been reached, will again change into a deceleration indeed, but can, then, exert a certain directional effect on the flow.

Instead of the trapezoidally corrugated plates, the plates provided with ridges of FIG. 2 can be used also in the case of FIG. 4 and, then, the widths and depths of the gutters will be chosen larger accordingly.

Further, even when using substantially sinusoidally corrugated plates, an improvement of the separator operation can be obtained if, at a suitable adaptation of the wavelength and height, the plates are arranged in phase opposition instead of in phase as in FIG. 1B.

An example of use of such a cross-flow separator for a liquid with a high viscosity is the treatment of fuel oil for marine engines contaminated by water, rust, sand, undesired distillation products (such as asphaltenes), etc. On board ships centrifuges are present which are adapted to remove such contaminations from the oil. In view of the rising oil prices, it is advantageous to use less purified, and therefore cheaper, fuel oil, but this will lead to a quick soiling and wear of the centrifuges. A separator according to the invention, in particular according to FIG. 4, can be advantageously used as a preseparator in which so much contaminant can be removed from the oil that it can be treated thereafter by means of a centrifuge.

What is claimed is:

1. In a gravity cross-flow separator of the type comprising mutually parallel spaced-apart plates defining a substantially horizontal liquid flow path between each pair of adjacent plates for passing a liquid to be treated by gravity separation, said plates being inclined relative to a horizontal place and defining upper and lower gutters extending substantially in the direction of greatest inclination of said plates and transversely to the direction of liquid flow for collecting components separated from the treated liquid disposed above and below said flow path, respectively, wherein the improvement comprises that said gutters have substantially trapezoidal or rectangular cross section so as to substantially contain separated material in said gutters against entrainment with said horizontal liquid flow, the upper gutters of each flow path being in phase alignment with the lower gutters of the same flow path.

2. The device of claim 1 wherein said plates are spaced apart sufficiently in relation to the depth of said gutters and the viscosity of the fluid flow so as to maintain substantially linear flow of liquid between the plates.

3. In a gravity cross-flow separator of the type comprising mutually parallel spaced-apart plates defining a substantially horizontal liquid flow path between each pair of adjacent plates for passing a liquid to be treated by gravity separation, said plates being inclined relative to a horizontal plane and defining upper and lower gutters extending substantially in the direction of the greatest inclination of said plates and transversely to the direction of liquid flow for collecting components separated from the treated liquid disposed above and below said flow path, respectively, wherein the improvement comprises that said plates are spaced apart sufficiently in relation to the depth of said gutters and the viscosity of the fluid flow so as to maintain a substantially linear flow of liquid between the plates; and wherein said plates are substantially plane and said gutters have a substantially rectangular cross-section and are defined by upstanding ridges provided on both sides of each of said plates, said ridges on opposite sides of said plates being substantially aligned with each other.

4. In a gravity cross-flow separator of the type comprising mutually parallel spaced-apart plates defining a substantially horizontal liquid flow path between each pair of adjacent plates for passing a liquid to be treated by gravity separation, said plates being inclined relative to a horizontal plane and defining upper and lower gutters extending substantially in the direction of the greatest inclination of said plates and transversely to the direction of liquid flow for collecting components separated from the treated liquid disposed above and below said flow path, respectively, wherein the improvement comprises that said plates are spaced apart sufficiently in relation to the depth of said gutters and the viscosity of the fluid flow so as to maintain a substantially linear flow of liquid between the plates; and wherein said gutters are defined by corrugations in said plates, said corrugations having substantially trapezoidal cross-sections, the corrugations in each pair of adjacent plates being arranged in phase opposition.

* * * * *